US006610389B2

(12) United States Patent
Ishimaru et al.

(10) Patent No.: US 6,610,389 B2
(45) Date of Patent: Aug. 26, 2003

(54) INK-JET RECORDING MATERIAL, AND RECORDING METHOD OF INK-JET RECORDING AND RECORDED MATERIAL USING THE SAME

(75) Inventors: Tomoko Ishimaru, Chiyoda-ku (JP); Yukio Tokunaga, Chiyoda-ku (JP); Masahiko Maruyama, Suwa (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 0 days.

(21) Appl. No.: 10/153,676

(22) Filed: May 24, 2002

(65) Prior Publication Data

US 2003/0081103 A1 May 1, 2003

(30) Foreign Application Priority Data

May 29, 2001 (JP) ....................................... 2001-159930
Mar. 29, 2002 (JP) ....................................... 2002-95011

(51) Int. Cl.[7] .................................................. B32B 3/00
(52) U.S. Cl. ...................................................... 428/195
(58) Field of Search ................................ 428/195, 219, 428/329, 331, 341

(56) References Cited

U.S. PATENT DOCUMENTS 5,171,626 A * 12/1992 Nagamine et al. .......... 428/212
5,955,142 A * 9/1999 Yoshino et al. ............. 427/205
6,183,851 B1 * 2/2001 Mishima .................. 428/304.4
6,203,899 B1 * 3/2001 Hirose et al. ............... 428/341
6,312,788 B1 * 11/2001 Mohri et al. ................ 428/195
6,326,055 B1 * 12/2001 Arai et al. .................. 427/195
6,358,605 B1 * 3/2002 Casper ....................... 428/343
6,391,825 B1 * 5/2002 Arai et al. .................. 503/227
6,432,550 B1 * 8/2002 Ohbayashi et al. ......... 428/511
6,436,513 B1 * 8/2002 Kitamura et al. ........... 428/195
6,465,086 B1 * 10/2002 Kitamura et al. ........... 428/212

FOREIGN PATENT DOCUMENTS

EP 1 095 784 A2 * 5/2001

OTHER PUBLICATIONS

Japanese Industrial Standard, Surface roughness–Definitions and designation, JIS B0601–1994, Edition 7, Feb. 8, 1994.

* cited by examiner

*Primary Examiner*—Cynthia H. Kelly
*Assistant Examiner*—B. Shewareged
(74) *Attorney, Agent, or Firm*—Paul E. White, Jr.; Magnelli Denison & Selter PLLC

(57) ABSTRACT

There are disclosed an ink-jet recording material which comprises a water resistant support, an ink-receptive layer containing inorganic fine particles having an average particle size of a primary particle of 3 to 30 nm on one surface of the support, and a back coating layer mainly comprising an organic polymer provided on an opposite surface of the support to the surface on which the ink-receptive layer is provided, wherein when an arithmetical mean roughness Ra measured with a cut off value of 0.8 mm regulated by JIS-B-0601-1994 of the surface on which the back coating layer has been provided of the water resistant support is made A $\mu$m, a density of the organic polymer in the back coating layer is made B g/cm$^3$, and an amount of a solid component of the organic polymer provided as the back coating layer is made C g/cm$^2$, then A is 1 to 5 $\mu$m and A, B and C satisfy the following formula (I):

$$0.6 \times A < C/B < 6 \quad (I)$$

a recording method and a recorded material using the same.

6 Claims, No Drawings

INK-JET RECORDING MATERIAL, AND RECORDING METHOD OF INK-JET RECORDING AND RECORDED MATERIAL USING THE SAME

BACKGROUND OF THE INVENTION

1. Field of the Invention

The present invention relates to an ink-jet recording material which is excellent in a printing paper feeding and conveying property and a feeding and conveying precision as well as has high ink-absorption property, and a recording method of an ink-jet recording using the same and a recorded material using the same, more specifically to an ink-jet recording material in which chalking immediately after printing with a pigment ink is prevented, and a recording method of an ink-jet recording using the same and a recorded material using the same.

2. Prior Art

As a recording material to be used for an ink-jet recording system, a recording material which comprises a porous ink-absorptive layer comprising a pigment such as amorphous silica, and a water-soluble binder such as polyvinyl alcohol being provided on a support such as a usual paper or the so-called ink-jet recording sheet has generally been known.

Also, in Japanese Patent Publication No. 56552/1991, Japanese Provisional Patent Publications No. 188287/1990, No. 81064/1998, No. 119423/1998, No. 175365/1998, No. 193776/1998, No. 203006/1998, No. 217601/1998, No. 20300/1999, No. 20306/1999 and No. 34481/1999, U.S. Pat. No. 5,612,281, and EP 0 813 978 A, and the like, there have been disclosed ink-jet recording materials using synthetic silica fine particles prepared by a gas phase process (hereinafter referred to as "fumed silica").

Moreover, in Japanese Provisional Patent Publications No. 276671/1990, No. 67684/1991, No. 251488/1991, No. 67986/1992, No. 263983/1992 and No. 16517/1993, there have been disclosed ink-jet recording materials using alumina hydrates. These fumed silica and alumina hydrates are ultra fine particle shaving an average particle size of a primary particle of several nm to several tens nm, and have characteristics of giving high glossiness and high ink-absorption properties. In recent years, a photo-like recording sheet has earnestly been desired, and glossiness becomes more important. As such a recording material, there has been proposed a recording material in which an ink-receptive layer mainly comprising these fine particles is coated on a water resistant support such as a polyolefin resin-coated paper (a polyolefin resin such as polyethylene, etc. is laminated on the both surfaces of paper) or a polyester film, etc.

However, in these ink-jet recording materials using a water resistant support such as a polyolefin resin-coated paper or a polyester film, there is a problem that they are inferior in a printing paper feeding and conveying property and a feeding and conveying precision at the time of printing, and there are some cases in which continuous feeding of paper is difficult or sufficient printing quality cannot be obtained. In particular, high speed printing of a printer proceeds at present and it has been desired to further improve a feeding and conveying precision to maintain printing quality.

When an ink-receptive layer is provided on such a water resistant support, the support itself does not have any ink-absorption property so that a relatively large amount of a composition for forming the ink-receptive layer shall be coated. In such a case, depending on materials of the ink-receptive layer, a problem of curl which is dependent on environment for preparation occurs so that a paper feeding and conveying property is lowered.

To solve such problems as mentioned above, a back coating layer has generally been provided on a back surface which is a different surface from that on which the ink-receptive layer is provided.

As a means for improving a paper feeding and conveying property of an ink-jet recording material made of paper, in Japanese Provisional Patent Publication No. 266550/1995 or No. 278357/1994, friction coefficients between recording materials and between a recording material and a paper feeding roll have been regulated. However, with regard to a recording paper using a water resistant support, it has different stiffness or modulus of elasticity from usual paper, so that there are portions that cannot judge only by the friction coefficient. Moreover, in Japanese Provisional Patent Publication No. 197839/1996, there has been proposed a recording paper using a film as a support and a back coating layer is provided, and in Japanese Provisional Patent Publication No. 142011/1997, there has been proposed a recording paper in which gelatin is back coated on a support made of a resin coated paper. However, the ink-receptive layers of the above references comprise a polymer component, so that they are inferior in ink-absorption property. Thus, they are difficult to give a high quality printing with a high speed printer and there is no description therein about improvements in a feeding and conveying precision and chalking with a pigment ink.

In Japanese Provisional Patent Publication No. 296669/2000, it has been proposed to prevent from uneven glossiness in case of using a dye ink by providing an ink-receptive layer mainly comprising fine particles such as fumed silica or alumina compound and by using a polymer latex as a back coating layer. However, this recording material uses a regular or irregular shaped fine microrough surface as a support or a surface of the ink-receptive layer is made fine microrough surface by applying a treatment to the surface of the ink-receptive layer, so that a surface glossiness is low and a feeding and conveying precision is rather lowered. Also, there is neither description about improvement in the feeding and conveying precision nor effects on printing quality with a pigment ink or on chalking by ink.

Thus, there have been proposed many measures in various kinds of items but they are insufficient as an ink-jet recording material using a water resistant support and having high glossiness and curl balance and excellent in a feeding and conveying precision.

In an ink-jet recording system, a water-soluble dye ink has been mainly used as ink, which is prepared by dissolving various kinds of water-soluble dyes in water or a mixture of water and an organic solvent(s). The water-soluble dye ink is excellent in preventing from clogging (no clogging) at an ink-projecting head of an ink-jet recording apparatus, and excellent in coloring property and resolution of printed image after printing. However, there is a problem in water resistance of the recorded image since the ink is water-soluble, and the water-soluble dye is inherently inferior in weather resistance (discoloration or disappearance of an image by light, air, temperature, humidity and the like). Thus, there are disadvantages in particular that the recorded image is rapidly faded or disappeared when the recorded sheet is displayed in the open.

On the other hand, whereas a pigment ink is excellent in water resistance and preservability, it has been said to be inferior in coloring property. However, some of recently developed pigment inks are excellent in coloring property than those of conventionally used whereby an ink-jet recording material for pigment ink is becoming more important.

As a problem inherently possessed by the pigment ink other than coloring property, there is mentioned a problem of chalking. The pigment ink has a relatively large particle size as compared with that of a dye and remains on a surface of a recording paper after printing. If its fixing property is not good, a phenomenon of chalking occurs, in which the ink is peeled off when the printed portion is rubbed, so that it is a significant problem of an ink-jet recording material. In particular, in a recording material for an ink-jet recording having a void structure using ultrafine particles, drying property after printing is good, so that there is a high possibility of causing chalking since printed papers are laminated within a short period of time after printing.

For the purpose of improving a feeding and conveying property or blocking resistance, there has been proposed to use spherical fine particle polymer having an average particle size of 5 to 15 $\mu$m in an ink-receptive layer in Japanese Provisional Patent Publication No. 25133/1995 and to use the similar spherical particle polymer in a back coating layer in Japanese Provisional Patent Publication No. 179025/1995. However, in the former, there is a problem of lowering glossiness at a white paper portion and in the latter, there are problems in a feeding and conveying precision and chalking of the pigment ink.

SUMMARY OF THE INVENTION

An object of the present invention is to provide a sheet for a high glossiness void-type ink-jet recording having a high ink-absorption capacity, an ink-jet recording material having a good feeding and conveying property and improved in a feeding and conveying precision, particularly to provide a sheet for ink-jet recording improved in chalking immediately after printing with the use of a pigment ink.

The present inventors have intensively studied about effects of a roughness of a back surface opposite to a surface on which an ink-receptive layer is provided of a water resistant support, a composition of a back coating layer and a composition of the ink-receptive layer on a feeding and conveying property, printing quality and chalking with the use of a pigment ink. As a result, they have found that a surface roughness and a surface covering rate by an organic polymer of the back surface of the water resistant support markedly affect the feeding and conveying precision, particularly in chalking by the pigment ink, in addition to the surface roughness and surface covering rate of the above-mentioned back surface, an average particle size of fumed silica or alumina hydrate constituting the ink-receptive layer affect thereon, and the following means solves the problems as mentioned above.

(1) An ink-jet recording material which comprises a water resistant support, an ink-receptive layer containing inorganic fine particles having an average particle size of a primary particle of 3 to 30 nm on one surface of the support, and a back coating layer mainly comprising an organic polymer provided on an opposite surface of the support to the surface on which the ink-receptive layer is provided, wherein when an arithmetical mean roughness Ra measured with a cut off value of 0.8 mm regulated by JIS-B-0601-1994 of the surface on which the back coating layer has been provided of the water resistant support is made A $\mu$m, a density of the organic polymer in the back coating layer is made B g/cm$^3$, and an amount of a solid component of the organic polymer provided as the back coating layer is made C g/cm$^2$, then A is 1 to 5 $\mu$m and A, B and C satisfy the following formula (I):

$$0.6\times A<C/B<6 \quad (I).$$

(2) A recording method which comprises adhering an ink composition to a recording material to carry out printing, wherein the ink-jet recording material mentioned in (1) is used as an ink-jet recording material.

(3) An ink-jet recording method which comprises ejecting liquid drops of an ink composition to a recording material and adhering the liquid drops to the recording material to carry out printing, wherein the ink-jet recording material mentioned in (1) is used as an ink-jet recording material.

(4) An ink-jet recording method which comprises printing is carried out by using a pigment ink on the ink-jet recording material mentioned in (1).

(5) A recorded material obtained by the recording method mentioned in any one of (2) to (4).

DESCRIPTION OF THE PREFERRED EMBODIMENTS

The ink-jet recording material according to the present invention comprises a water resistant support, an ink-receptive layer containing inorganic fine particles having an average particle size of a primary particle of 3 to 30 nm on one surface of the support (hereinafter referred to as "a front surface"), and a back coating layer mainly comprising an organic polymer provided on an opposite surface (hereinafter referred to as "a back surface") of the support to the surface on which the ink-receptive layer is provided, and when an arithmetical mean roughness Ra measured with a cut off value of 0.8 mm regulated by JIS-B-0601-1994 of the surface on which the back coating layer has been provided of the water resistant support is made A ($\mu$m), a density of the organic polymer in the back coating layer is made B (g/cm$^3$), and an amount of a solid component of the organic polymer provided as the back coating layer is made C (g/cm$^2$), then A is 1 to 5 $\mu$m and A to C satisfy the above-mentioned formula (I), whereby an ink-jet recording material having a good feeding and conveying property and a feeding and conveying precision, high ink-absorption property and glossiness and preventing from chalking immediately after printing when printing is carried out by a pigment ink can be obtained.

The term "chalking" means a phenomenon in which a pigment ink at a printed portion existing at the outermost surface of an ink-receptive layer of an ink-jet recording material is rubbed by contacting with a back surface of the recording material or the like, and at the worst case, it is peeled off. When no back coating layer is provided onto a back surface of a resin-coated paper or a film in which the back surface of a water resistant support is subjected to relatively smooth and finely roughening treatment, it is relatively poor in elasticity as compared with paper, but chalking hardly occurs since a surface of the ink-receptive layer to be contacted with pigment ink is smooth. However, it has a small contacting surface area with conveying rollers due to low elasticity and the feeding and conveying precision is poor, so that it is difficult to use. When a back surface of the water resistant support is subjected to roughening treatment and has no back coating layer, a paper feeding property thereof is good but it is inferior in the feeding and conveying precision and chalking.

An arithmetical mean roughness of the front surface of the water resistant support to be used in the present invention is generally 2 μm or less, preferably 0.1 to 1.3 μm, whereby glossiness after providing an ink-receptive layer is good. An arithmetical mean roughness A of the back surface of the water resistant support is 1 to 5 μm, and by making the above-mentioned C/B of the back coating layer mainly comprising an organic polymer (0.6×A) or more and less than 6, a certain amount of an area or more of a concave portion of the back surface of the recording material is buried by mainly an organic polymer, elasticity is provided to the recording material. Moreover, a contact area with the conveying rollers is increased, so that a feeding and conveying precision is improved, and elasticity and smoothness are improved, so that it can be expected to be improved in chalking with pigment ink. If C/B is less than (0.6×A), sufficient feeding and conveying precision cannot be obtained, while if it is 6 or more, a curling property and a feeding and conveying property worsen, so that it is not preferred. Incidentally, if A is less than 1 μm, a feeding and conveying property is poor irrespective of providing or without providing a back coating layer mainly comprising an organic polymer, and if a large amount of fine particles is added to the back coating layer to improve the feeding and conveying property, a feeding and conveying precision is contrary lowered so that it is not preferred. If A is larger than 5 μm, a large amount of the organic polymer is required in the back coating layer to improve a feeding and conveying precision, but a curling property worsens so that it is not preferred.

In the present invention, the back coating layer contains an organic polymer, and an amount of the organic polymer is preferably 50% by weight or more, more preferably 70% by weight or more based on the total weight of the back coating layer. By making the amount 50% by weight or more, elasticity becomes good when a conveying roller and a back surface of a sheet for recording are contacted to each other, and a feeding and conveying precision is improved, so that a printing quality becomes good. Also, due to increase of the organic polymer component, unevenness at the back surface becomes plane, so that chalking difficultly occurs when printing is carried out with pigment ink whereby it is preferred.

Moreover, a feeding and conveying precision can be improved and chalking with pigment ink can be prevented by making a surface covering rate at the back surface of the water resistant support by an organic polymer of a back coating layer 70% or more, more preferably 90% or more. By making the surface covering rate 70% or more, a surface area at which the conveying roller and the organic polymer on the back surface of the recording material is increased to a sufficient extent and elasticity becomes high, so that it can be expected that a feeding and conveying precision is improved and elasticity and smoothness are increased, whereby chalking of pigment ink can be improved. If the surface covering rate is less than 70%, a feeding and conveying precision becomes low since elasticity of the water resistant support itself is low which is different from paper, whereas properties of the water resistant support itself affect on ink-jet characteristics in addition to the properties of the polymer.

In the present specification, the surface covering rate means a ratio of an organic polymer in a coating layer covering the back surface of the water resistant support, and the surface covering rate varies depending on the conditions of the surface of the support even when the same amount of a coating material is coated thereon. The surface covering rate of the back coating layer according to the present invention can be obtained by adding food red to a coating solution for preparing the back coating layer, coating the solution on the support to form a sheet covered by a colored back coating layer, and taking an image of the back coating layer by Microscope (available from KEYENCECO., VH-6300, trade name) and calculating (Surface area stained by food red/whole surface area)×100. A value multiplying the surface covering rate of the back coating layer by a volume ratio of the organic polymer occupied in the back coating layer is calculated to as a surface covering rate by the organic polymer. Incidentally, when a back coating layer has already been provided onto the support and the organic polymer used contains an atom different from those contained in the support, a surface covering rate can be obtained by specifying the coated portion by X ray microanalyzer XMA (tradename: EDAX, manufactured by EDAX CO.) observation, or the like, or by observation with eyes at a colored portion when the organic polymer can be stained by a chemical such as an iodine starch reaction.

Also, the above-mentioned surface covering rate participates in chalking with pigment ink. When no back coating layer is provided to a resin coated paper or a film in which the back surface of the water resistant support is subjected to a relatively smooth and finely roughening treatment, chalking hardly occurs since a surface of the ink-receptive layer to be contacted with pigment ink is smooth. However, there is no back coating layer, so that elasticity is low and a feeding and conveying precision is markedly worsened whereby it is difficult to use. That is, it is necessary to provide a back coating layer wherein a surface of a back coating layer contacting with pigment ink is made smooth and to have elasticity whereby preventing from chalking, and a friction coefficient with a conveying roller or contacting points with the conveying roller are increased whereby a feeding and conveying precision is improved.

A water resistant support to be used in the present invention may be used either a transparent support or an opaque support. As the transparent support, there may be used those conventionally known in the art, for example, a film or a plate comprising a polyester resin, a diacetate resin, a triacetate resin, an acrylic resin, a polycarbonate resin, a polyvinyl chloride, a polyimide resin, cellophane, celluloid or the like, a glass plate and the like, and of these, a film comprising polyethylene terephthalate is most preferably used.

As an opaque support, there may be used either of those conventionally known in the art including a synthetic paper, a resin-coated paper, an opaque film prepared by adding a pigment or the like to the above-mentioned transparent support, or a foamed film. In the points of glossiness and smoothness, a resin-coated paper and various kinds of films are preferably used. Of these, a resin-coated paper similar to a support for photography and a film comprising polyethylene terephthalate to which a pigment having high whiteness and strength is added are preferably used in view of feelings by touching and high quality.

The arithmetical mean roughness A at the back surface of the water resistant support according to the present invention can be made 1 to 5 μm by adding inorganic particles with a large particle size at the time of preparing a resin film or treating the support through rollers onto the surfaces of which have been subjected to a suitable roughening treatment. Incidentally, a thickness of the water resistant support to be used in the present invention is preferably about 50 μm to about 300 μm.

A base paper constituting the resin-coated paper as a water resistant support to be preferably used in the present invention is not particularly limited, and any paper generally used may be employed. More preferably a smooth base paper such as that used as a paper for a photographic support may be used. As pulp for constituting the base paper, natural pulp, regenerated pulp, synthetic pulp, etc. may be used singly or in combination of two or more. In the base paper, various additives conventionally used in the papermaking industry such as a sizing agent, a strengthening additive of paper, a loading material, an antistatic agent, a fluorescent brightener, a dye, etc. may be formulated.

Moreover, a surface sizing agent, a surface strengthening additive of paper, a fluorescent brightener, an antistatic agent, a dye, an anchoring agent, etc. may be coated on the surface of the sheet.

A thickness of the base paper is not particularly limited, and preferably that having a good surface smoothness prepared by compressing paper during paper-making or after paper-making by applying pressure using a calender, etc. A basis weight thereof is preferably 30 to 250 $g/m^2$.

As a resin of the resin-coated paper, a polyolefin resin or a resin which cures by irradiation of electronic rays may be used. The polyolefin resin may include a homopolymer of an olefin such as low density polyethylene, high density polyethylene, polypropylene, polybutene, polypentene, etc.; a copolymer comprising two or more olefins such as an ethylene-propylene copolymer, etc.; or a mixture thereof, and these polymers having various densities and melt viscosity indexes (melt index) may be used singly or in combination of two or more.

Also, to the resin of the resin-coated paper, various kinds of additives including a white pigment such as titanium oxide, zinc oxide, talc, calcium carbonate, etc.; an aliphatic amide such as stearic amide, arachidamide, etc.; an aliphatic acid metal salt such as zinc stearate, calcium stearate, aluminum stearate, magnesium stearate, etc.; an antioxidant such as Irganox 1010, Irganox 1076 (both trade names, available from Ciba Geigy AG), etc.; a blue-color pigment or dye such as cobalt blue, ultramarine blue, cecilian blue, phthalocyanine blue, etc,; a magenta-color pigment or dye such as cobalt violet, fast violet, manganese violet, etc.; a fluorescent brightener, an UV absorber, etc. may be preferably added optionally combining two or more.

The resin-coated paper to be preferably used as a support in the present invention can be prepared, in the case of using a polyolefin resin, by casting a melted resin under heating on a running base paper, which is so-called the extrusion coating method, whereby the both surfaces of the base paper are coated by the resin. In the case of using a resin which cures by irradiation of electronic rays, the resin is coated on a base paper by means of a coater conventionally used such as a gravure coater, a blade coater, etc., then, electronic rays are irradiated to the resin whereby coating the base paper with the resin. Also, it is preferred to subject to an activation treatment to a base paper before coating the resin to the base paper, such as a corona discharge treatment, a flame treatment, etc. The surface (the front surface) on which an ink-receptive layer is to be coated of the support is treated to be a gloss surface or a matte surface depending on the purposes by a surface shape of cooling rollers at the time of extrusion coating, and in the present invention, a gloss surface is predominantly used. In the point of preventing curl, a resin is preferably coated on the back surface of the support and the back surface is so treated to have an arithmetical mean roughness of 1 to 5 $\mu$m in the same manner as in the front surface. If necessary, the activation treatment such as the corona discharge treatment, the flame treatment, etc. may be applied to the front surface or to the both surfaces of the front and back surfaces. Also, a thickness of the resin layer is not particularly limited, and is generally in the range of about 5 to about 50 $\mu$m on the front surface or both of the front and back surfaces.

The organic polymer to be used in the back coating layer of the water resistant support according to the present invention is not particularly limited, and a polymer or a latex which is a dispersion of a polymer molecule conventionally used as a binder for an ink-jet recording material may be used. More specifically, there may be mentioned gelatin, a polyvinyl alcohol, a polyvinylpyrrolidone, a polyvinylpyridinium halide, vinyl formal and its derivative thereof such as various kinds of modified polyvinyl alcohols, a polymer containing an acrylic group such as polyacrylamide, polydimethyl acrylamide, polydimethylaminoacryalte, sodium polyacrylate, a salt of acrylic acid and methacrylic acid copolymer, sodium polymethacrylate, a salt of acrylic acid and vinyl alcohol copolymer, starch, oxidized starch, carboxyl starch, dialdehyde starch, cationized starch, dextrin, sodium alginate, a rubber such as natural rubber, Gum Arabic, acrylate rubber, styrene-butadiene rubber, etc., a natural polymer or a derivative thereof such as casein, pulluran, dextran, methyl cellulose, ethyl cellulose, carboxymethyl cellulose, hydroxypropyl cellulose, etc., a synthetic polymer such as polyethylene glycol, polypropylene glycol, polyvinyl ether, polyglycerin, maleic acid and alkyl vinyl ether copolymer, maleic acid and N-vinyl pyrrole copolymer, styrene and maleic anhydride copolymer, polyethyleneimine, polyurethane, etc.

These organic polymers may be used singly or in combination of two or more. Also, a preferable glass transition temperature is −10° C. to 120° C. If it is lower than −10° C., the mixture becomes viscous and adheres to a conveying roller, so that a feeding and conveying property is lowered. Also, if it is higher than 120° C., elasticity is lowered and preferably effect can hardly be obtained. The organic polymer is preferably one which does not generate a viscous property, so that a cross-linked organic polymer to have water resistance or a latex which becomes a water resistant film by drying alone is particularly preferably used.

To the back coating layer of the present invention, an inorganic pigment or an organic pigment may be added. These pigments lower friction coefficient between the front surface and the back surface of the recording materials for ink-jet, whereby they have an effect of improving a continuous feeding and conveying property. A preferred amount of these pigments to be added may vary depending on the particle size of the pigment to be used, and is preferably 30 parts by weight or less based on 100 parts by weight of the organic polymer in the back coating layer. If the amount exceeds 30 parts by weight, elasticity between the conveying roller and the organic polymer in the back coating layer lowers whereby a feeding and conveying precision is lowered. Also, a preferred particle size of the pigment is 0.8 to 1.5 times the thickness of the back coating layer. If the particle size is too small, an effect of lowering a friction coefficient between sheets is lowered, while if it is too large, unevenness will occur in the back coating layer whereby chalking of the pigment ink is likely generated.

Also, to the back coating layer, various kinds of conventionally known additives such as a surfactant, a hardening agent, a coloring dye, a coloring pigment, an UV absorber, an antioxidant, a dispersant of the pigment, an antifoaming agent, a leveling agent, an antiseptic agent, a fluorescent brightener, a viscosity stabilizer, a pH controller, an inorganic antistatic agent, an organic antistatic agent, etc. may be added in addition to the inorganic pigment and organic pigment. Provided that the added amount shall be controlled so that 70% by weight or more of the solid content of the whole back coating layer is the organic polymer.

As inorganic fine particles having an average particle size of a primary particle of 3 to 30 nm to be used for an ink-receptive layer of the present invention, there may be mentioned various kinds of fine particles conventionally known such as synthetic silica, alumina, alumina hydrate, calcium carbonate or the like, and they may be used in combination of two or more inorganic fine particles. In particular, silica prepared by a gas phase method, alumina and alumina hydrate are preferably used since high glossiness can be obtained.

The inorganic fine particles having an average particle size of primary particles in the ink-receptive layer of 3 to 30 nm are preferably contained in an amount of 8 $g/m^2$ or more, more preferably in the range of 10 to 35 $g/m^2$. If the amount is less than 8 $g/m^2$, ink-absorption property is poor, while if it is too much, strength lowers and crack likely generates. An amount of a hydrophilic binder to be used in combination with the inorganic fine particles is preferably 35% by weight or less, particularly preferably 10 to 30% by weight based on the amount of the inorganic fine particles.

In the present invention, the inorganic fine particles having an average particle size of the primary particle of 3 to 30 nm are preferably contained in the ink-receptive layer in an amount of preferably 50% by weight or more, more preferably 60% by weight or more, further preferably 65% by weight or more based on the total solid component of the ink-receptive layer in view of ink-absorption property.

In synthetic silica, there are two types of materials, one (precipitated silica) of which is prepared by the wet process and the other (fumed silica) is prepared by the gas phase process. As the silica prepared by the wet process, there are (1) a silica sol obtained by metathesis of sodium silicate by an acid or passing through an ion exchange resin layer; (2) a colloidal silica obtained by heating and maturing the silica sol of (1); (3) a silica gel obtained by gelling silica sol in which formation conditions thereof are changed whereby primary particles of a silica gel are agglomerated to form three-dimensional secondary particles having a diameter of several $\mu$m to 10 $\mu$m; and (4) a synthetic silicic acid compound mainly comprising silicic acid obtained by heating silica sol, sodium silicate, sodium aluminate, etc.

Fumed silica to be preferably used in the present invention is also called to as the drying method silica, and it can be generally prepared by a flame hydrolysis method. More specifically, it has been generally known a method in which silicon tetrachloride is burned with hydrogen and oxygen. The fumed silica is commercially available from Nippon Aerosil K.K. (Japan) under the trade name of Aerosil, and K.K. Tokuyama (Japan) under the trade name of QS type, etc. An average particle size of primary particles of the fumed silica in the present invention is 3 to 30 nm, preferably 3 to 25 nm. The fumed silica is present in the form of secondary particles having a suitable void by aggregation, so that it is preferably used by pulverizing or dispersing with ultrasonic wave, a high-pressure homogenizer or a counter collision type jet pulverizer since it has good ink-absorption property and glossiness.

The alumina hydrate to be used in the present invention is represented by the structural formula of $Al_2O_3 \cdot nH_2O$ (n=1 to 3). When n is 1, it shows alumina hydrate having a boehmite structure, and when n is larger than 1 and less than 3, it shows alumina hydrate having a pseudo boehmite structure. In the present invention, there may be used, for example, alumina hydrates as described in Japanese Provisional Patent Publications No. 276671/1990, No. 67684/1991, No. 251488/1991, No. 67986/1992, No. 263983/1992 and No. 16517/1993.

In the present invention, the average particle diameter of the primary particle is obtained from an observation by an electron microscope where the particles are dispersed sufficiently enough for being identified, and for each of 100 particles existing in a predetermined area, a diameter of a circle whose area is equivalent to a projected area of each particle is taken as a particle diameter for that particle. An average particle size of the primary particles of the fumed silica and alumina hydrate fine particles to be used in the present invention is 3 to 30 nm, and preferably 3 to 25 nm.

Incidentally, an average secondary particle size of the fumed silica and alumina hydrate fine particles to be used in the present invention can be obtained by measuring particle sizes of a diluted dispersion by a laser diffraction/scattering type particle size distribution measuring device. In the present invention, the average secondary particle size is generally 50 to 400 nm, preferably 50 to 300 nm.

To the ink-receptive layer of the present invention, a hydrophilic binder is added to maintain the characteristics as a film. As the hydrophilic binder to be used, those conventionally known various kinds of binders can be used. For using the hydrophilic binder, it is important that the hydrophilic binder does not clog the voids by swelling at the initial stage of permeation of ink. From this point of view, a hydrophilic binder having a relatively low swellability at around the room temperature is preferably used. A particularly preferred hydrophilic binder is a completely or partially saponified polyvinyl alcohol or a cationic-modified polyvinyl alcohol.

Among the polyvinyl alcohols, particularly preferred is partially or completely saponified polyvinyl alcohol having a saponification degree of 80% or more. Polyvinyl alcohols having an average polymerization degree of 500 to 5000 are preferred. Also, as the cationic-modified polyvinyl alcohol, there may be mentioned, for example, a polyvinyl alcohol having a primary to tertiary amino groups or a quaternary ammonium group at the main chain or side chain of the polyvinyl alcohol as disclosed in Japanese Provisional Patent Publication No. 10483/1986.

Also, other hydrophilic binder may be used in combination, but an amount thereof is preferably 20% by weight or less based on the amount of the polyvinyl alcohol.

In the present invention, in the respective layers of the ink-receptive layers, a weight ratio of the hydrophilic binder to the inorganic fine particles having an average particle size of the primary particles of 3 to 30 nm is generally selected from the range of 0.05 to 0.45. Preferred weight ratio is selected from the range of 0.06 to 0.40.

The ink-jet recording material of the present invention preferably has a haze value regulated by JIS-K-7105 of the ink-receptive layer of 40% or less, more preferably 30% or less. If it is higher than 40%, printing density is lowered and coloring property is also lowered.

The respective layers of the ink-receptive layers according to the present invention preferably contain a cationic compound for the purpose of improving water resistance. As the cationic compound, there may be mentioned a cationic polymer and a water-soluble metallic compound.

As the cationic compound to be used in the present invention, there may be mentioned, for example, a cationic polymer and a water-soluble metallic compound. As the cationic polymer to be used in the present invention, there may be preferably mentioned polyethyleneimine, polydiallylamine, polyallylamine, polyvinylamine, as well as polymers having a primary to tertiary amino group or a quaternary ammonium group as disclosed in Japanese Provisional Patent Publications No.20696/1984, No. 33176/1984, No. 33177/1984, No. 155088/1984, No. 11389/1985, No. 49990/1985, No. 83882/1985, No. 109894/1985, No. 198493/1987, No. 49478/1988, No. 115780/1988, No. 280681/1988, No. 40371/1989, No. 234268/1994, No. 125411/1995 and No. 193776/1998, etc. An average molecular weight (Mw) of these cationic polymers is preferably in the range of 5,000 to 100,000.

An amount of these cationic polymers is preferably about 1% by weight to about 10% by weight, more preferably, about 2% by weight to about 7% by weight based on the amount of the inorganic fine particles.

The water-soluble metallic compound to be used in the present invention may include, for example, a water-soluble polyvalent metallic salt. As such a salt, there may be mentioned a water-soluble salt of a metal selected from the group consisting of calcium, barium, manganese, copper, cobalt, nickel, aluminum, iron, zinc, zirconium, chromium, magnesium, tungsten, and molybdenum. More specifically, such a water-soluble metallic compound may include, for example, calcium acetate, calcium chloride, calcium formate, calcium sulfate, barium acetate, barium sulfate, barium phosphate, manganese chloride, manganese acetate, manganese formate dihydrate, ammonium manganese sulfate hexahydrate, cupric chloride, copper (II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, amide nickel sulfate tetrahydrate, aluminum sulfate, aluminum sulfite, aluminum thiosulfate, poly(aluminum chloride), aluminum nitrate nonahydrate, aluminum chloride hexahydrate, ferrous bromide, ferrous chloride, ferric chloride, ferrous sulfate, ferric sulfate, zinc bromide, zinc chloride, zinc nitrate hexahydrate, zinc sulfate, zirconium acetate, zirconium chloride, zirconium oxychloride octahydrate, zirconium hydroxychloride, chromium acetate, chromium sulfate, magnesium sulfate, magnesium chloride hexahydrate, magnesium citrate nonahydrate, sodium phosphorus wolframate, tungsten sodium citrate, dodecawolframatophosphate n hydrate, dodecawolframatosilicate 26 hydrate, molybdenum chloride, dodecamolybdatephosphate n hydrate, etc.

The above-mentioned poly(aluminum hydroxychloride) compound is a water-soluble poly(aluminum hydroxide) a main component of which is represented by the following formula (A), (B) or (C), and which contains a polynuclear condensed ion which is basic and a polymer in a stable form, such as $[Al_6(OH)_{15}]^{3+}$, $[Al_8(OH)_{20}]^{4+}$, $[Al_{13}(OH)_{34}]^{5+}$, $[Al_{21}(OH)_{60}]^{3+}$, etc.

$$[Al_2(OH)_nCl_{6-n}]_m \quad (A)$$

$$[Al(OH)_3]_nAlCl_3 \quad (B)$$

$$Al_n(OH)_mCl_{(3n-m)} \; 0<m<3n \quad (C)$$

These water-soluble aluminum compounds are commercially available from Taki Chemical, K.K., Japan under the trade name of poly(aluminum chloride) (PAC, trade name) as a water treatment agent, from Asada Chemical K.K., Japan under the trade name of poly(aluminum hydroxide) (Paho, trade name), from K.K. Riken Green, Japan under the trade name of Pyurakemu WT (trade name) and other manufacturers with the same objects whereby various kinds of different grades can be easily obtained. In the present invention, these commercially available products may be used as such. Of these products, there is a product having an unsuitably low pH. In such a case, it may be used by optionally adjusting the pH of the product.

In the present invention, an amount of the above-mentioned water-soluble metallic compound in the ink-receptive layer is preferably about 0.1 to 8 $g/cm^2$, more preferably about 0.2 to 5 $g/cm^2$.

The above-mentioned cationic compound may be used in combination of two or more compounds. For example, it is preferred to use the cationic polymer and the water-soluble metallic compound in combination.

The ink-receptive layer of the present invention may further contain various kinds of oil droplets to improve brittleness of a film. As such oil droplets, there may be mentioned a hydrophobic organic solvent having a high boiling (for example, liquid paraffin, dioctyl phthalate, tricresyl phosphate, silicone oil, etc.) or polymer particles (for example, particles in which at least one of a polymerizable monomer such as styrene, butyl acrylate, divinyl benzene, butyl methacrylate, hydroxyethyl methacrylate, etc. is/are polymerized) each having a solubility in water at room temperature of 0.01% by weight or less. Such oil droplets can be used in an amount in the range of about 10% to about 50% by weight based on the amount of the hydrophilic binder.

In the respective ink-receptive layer of the present invention, it is preferred to use a cross-linking agent (film hardening agent) of the binder for the purpose of improving water resistance and dot reproducibility. Specific examples of the cross-linking agent may include an aldehyde type compound such formaldehyde and glutaraldehyde; a ketone compound such as diacetyl and chloropentanedione; bis(2-chloroethylurea), 2-hydroxy-4,6-dichloro-1,3,5-triazine, a compound having a reactive halogen as disclosed in U.S. Pat. No. 3,288,775; divinylsulfone; a compound having a reactive olefin as disclosed in U.S. Pat. No. 3,635,718; a N-methylol compound as disclosed in U.S. Pat. No. 2,732,316; an isocyanate compound as disclosed in U.S. Pat. No. 3,103,437; an aziridine compound as disclosed in U.S. Pat. Nos. 3,017,280 and 2,983,611; a carbodiimide type compound as disclosed in U.S. Pat. No. 3,100,704; an epoxy compound as disclosed in U.S. Pat. No. 3,091,537; a halogen carboxyaldehyde compound such as mucochloric acid, a dioxane derivative such as dihydroxydioxane, an inorganic cross-linking agent such as chromium alum, zirconium sulfate, boric acid and a borate, and they may be used independently or in combination of two or more. Of these, boric acid and a borate are particularly preferred. An amount of the cross-linking agent to be added is preferably 0.01 to 10 g, more preferably 0.1 to 5 g based on 100 g of the water-soluble polymer constituting the ink-receptive layer.

In the present invention, to the ink-receptive layer, various kinds of conventionally known additives such as a coloring dye, a coloring pigment, a fixing agent of an ink dye, an UV absorber, an antioxidant, a dispersant of the pigment, an antifoaming agent, a leveling agent, an antiseptic agent, a fluorescent brightener, a viscosity stabilizer, a pH buffer, etc. may be added in addition to the surfactant and the hardening agent.

When the ink-receptive layer comprises at least two layers, an average particle size of primary particles of the fumed silica or the alumina hydrate contained in the nearest layer to the support is preferably smaller than an average particle size of primary particles of the fumed silica or the alumina hydrate contained in the farthest layer from the support for preventing chalking at the time of printing with pigment ink.

The ink-jet recording material of the present invention has high glossiness, and chalking of pigment ink thereof is liable to be conspicuous as compared with a recording material having a low feeling in glossiness. To prevent chalking with pigment ink while maintaining a feeling of glossiness, it is necessary to strengthen a binding force with ink at the surface of the ink-receptive layer. The pigment ink has a larger particle size as compared with that of the dye ink, so that it is preferred to use particles having a larger particle size in the ink-receptive layer of the recording material, and the particle size at the ink-receptive layer farthest from the support is preferably larger than that of the particles in the lower layers which are nearer to the support than the above.

An arithmetical mean roughness of the ink-receptive layer of the present invention measured by a cut off value of 0.8 mm according to JIS-B-0601-1994 is preferably 1.3 $\mu$m or less, so that high glossiness and good feeding and conveying precision can be obtained.

Also, in the recording material of the present invention, the ink-receptive layer is made a constitution of two or more layers, the ink-receptive layer farthest from the support preferably contains an alumina hydrate. Among the inorganic fine particles, the alumina hydrate has high surface glossiness and can give an ink-jet recording material having good glossiness. That is, even when a layer having good ink-absorption property but glossiness being markedly low in the case of a singly layer is used as an under layer, an ink-jet recording material having an extremely high glossiness can be obtained in the present invention as long as the above-mentioned outermost layer is employed. Also, particularly when printing is carried out by using pigment ink, there is a merit that glossiness at the printed portion becomes high.

A coating amount of the solid component in the ink-receptive layer farthest from the support is preferably 1/10 to 1/3 based on the total coating amount in view of glossiness and ink-absorption property.

Also, an ink-jet recording material having high glossiness and a void structure which uses inorganic fine particles such as fumed silica or alumina compound has a weak surface and high smoothness. Thus, it has a drawback that flaws or scratches likely generate on the surface thereof by rubbing with rollers at the time of processing or when the materials are used by feeding a plural number of sheets and printing. Also, a problem in a feeding and conveying property likely occurs at the time of feeding papers or at the inside of the printing apparatus.

To decrease surface flaws or scratches, there have been proposed to add filler particles having a large particle size of 3 $\mu$m or more to the surface of the ink-receptive layer in Japanese Patent Publications No. 65036/1988, No. 65038/1988 and the like, and to use spherical fine particle polymer having an average particle size of 5 to 15 $\mu$m to improve a feeding and conveying property or a blocking property in Japanese Provisional Patent Publication No. 25133/1995. However, in an ink-jet recording material having high surface glossiness, it is difficult to satisfy all of the glossiness, feeding and conveying property and preventing from surface flaws simultaneously.

In the recording material of the present invention, by simultaneously adding both of fine particles having an average particle size of 1 $\mu$m or more to less than 5 $\mu$m and fine particles having an average particle size of 5 $\mu$m or more and 20 $\mu$m or less to an ink-receptive layer, a feeding and conveying property can be improved and surface flaws can be prevented without decreasing surface glossiness. In particular, by adding these particles to the ink-receptive layer farthest from the support, the effects are preferably increased. By providing a back coating layer comprising an organic polymer onto the back surface of the support, a feeding and conveying precision is improved whereby a printing quality becomes good. Moreover, when a suitable unevenness is provided on the surface of the ink-receptive layer by the fine particles to be added to the surface and a pressure applied to the surface is small, contacting points between the pigment ink on the surface of the ink-receptive layer and the back surface or the like are decreased, whereby chalking of the pigment ink is prevented. An amount of the two kinds of fine particles to be added is preferably 0.05 to 2 g/$m^2$, more preferably 0.1 to 1.5 g/$m^2$ in total. When these two kinds of fine particles are used in such an amount, there is substantially no decrease in contacting surface area when a pressure between conveying rollers is high, and it does not affect on the feeding and conveying precision.

Two kinds of fine particles, one of which has an average particle size of 1 $\mu$m or more to less than 5 $\mu$m and the other has an average particle size of 5 $\mu$m or more and 20 $\mu$m or less of the present invention, are particles comprising an inorganic or organic material such as titanium oxide, starch particles, silica particles, calcium carbonate, glass beads, barium sulfate, polycarbonate, Polymethyl methacrylate, polyethyl methacrylate, polybutyl methacrylate, polystyrene, polyacrylate, polyurethane copolymer and the like. In particular, as fine particles with smaller particle size which less affect on glossiness due to smaller particle size, organic type fine particles having a relatively high hardness are preferably used in the point of scratch resistance. As fine particles with larger particle size which much affect on glossiness due to larger particle size, inorganic type fine particles are preferably used since they are porous, so that ink can be easily retained at the surface and inside of the fine particles and relatively less affects on the glossiness (particularly glossiness at the printed portion). Both of the particles may have any shape and may be amorphous, and preferably a spherical since smoothness is good and scratch resistance can be improved.

A solid content of the two kinds of the fine particles (big and small) having an average particle size of 1 $\mu$m or more to less than 5 $\mu$m and fine particles having an average particle size of 5 $\mu$m or more and 20 $\mu$m or less to an ink-receptive layer according to the present invention is preferably, in total, 0.05 to 2.0 g/$m^2$, more preferably 0.1 to 1.5 g/$m^2$. If it is less than 0.05 g/$m^2$, effects of improving a feeding and conveying property and preventing surface flaws are insufficient, while if it exceeds 2.0 g/$m^2$, glossiness is lowered.

In the present invention, it is preferred to provide a primer layer mainly comprising a natural polymer compound or a synthetic resin on the surface of the support onto which the ink-receptive layer is provided. After coating an ink-receptive layer composition containing inorganic fine particles of the present invention on said primer layer, the material is cooled and dried at a relatively low temperature, transparency of the ink-receptive layer is further increased.

The primer layer to be provided on the support mainly comprises a natural polymer compound such as gelatin or casein, or a synthetic resin. Such a resin include, for example, an acrylic resin, a polyester resin, a vinylidene chloride resin, a vinyl chloride resin, a vinyl acetate resin, a polystyrene resin, a polyamide resin, a polyurethane resin and the like.

The above-mentioned primer layer is provided on the support with a thickness of 0.01 to 5 μm (dry film thickness). It is preferably in the range of 0.05 to 5 μm.

In the present invention, the coating method of the respective layers constituting the ink-receptive layer or the back coating layer is not particularly limited, and a coating method conventionally known in the art maybe used. For example, there may be mentioned a slide bead system, a curtain system, an extrusion system, an air knife system, a roll coating system, a rod bar coating system, etc.

In the present invention, it is preferred to use a system such as a slide bead system, in which the respective layers constituting the ink-receptive layers are substantially simultaneously coated without providing a drying step since characteristics required for the respective layers can be obtained with good efficiency and production efficiency is also good. That is, by laminating the respective layers in wet conditions, the components contained in the respective layers are difficultly impregnated into an under layer thereof, so that it can be considered that the respective components in the respective layers can be well maintained in the layer after drying.

EXAMPLES

In the following, the present invention is explained in more detail by referring to Examples, but the present invention is not limited by these Examples. Incidentally, all “part(s)” and “%” mean “part(s) by weight” and “% by weight” of a solid component, respectively.

<Preparation of Support 1>

A mixture of a bleached kraft pulp of hardwood (LBKP) and a bleached sulfite pulp of hardwood (NBSP) with a weight ratio of 1:1 was subjected to beating until it becomes 300 ml by the Canadian Standard Freeness to prepare a pulp slurry. To the slurry were added alkyl ketene dimer in an amount of 0.5% by weight based on the amount of the pulp as a sizing agent, polyacrylamide in an amount of 1.0% by weight based on the same as a strengthening additive of paper, cationic starch in an amount of 2.0% by weight based on the same, and polyamide epichlorohydrin resin in an amount of 0.5% by weight based on the same, and the mixture was diluted by water to prepare a 1% by weight slurry. This slurry was made paper by a fourdrinier paper machine to have a basis weight of 170 $g/m^2$, dried and subjected to moisture conditioning to prepare a base paper for a polyolefin resin-coated paper. A polyethylene resin composition comprising 100% by weight of a low density polyethylene having a density of 0.918 $g/cm^3$ and 10% by weight of anatase type titanium oxide dispersed uniformly in the resin was melted at 320° C. and the melted resin composition was subjected to extrusion coating on the above-mentioned base paper with a thickness of 35 μm by 200 m/min and subjected to extrusion coating by using a cooling roller subjected to slightly roughening treatment to provide a front resin layer. An arithmetical mean roughness thereof after the slightly roughening treatment was 0.11 μm. On the other surface of the base paper, a blended resin composition comprising 70 parts by weight of a high density polyethylene resin having a density of 0.962 $g/cm^3$ and 30 parts by weight of a low density polyethylene resin having a density of 0.918 $g/cm^3$ was melted similarly at 320° C. and the melted resin composition was subjected to extrusion coating with a thickness of 30 μm and subjected to extrusion coating by using a cooling roller subjected to roughening treatment to provide a back resin layer. An arithmetical mean roughness thereof after the roughening treatment was 1.32 μm Onto the front surface of the above-mentioned polyolefin resin-coated paper was subjected to a high frequency corona discharge treatment, and then, a coating solution for forming a primer layer was coated thereon to have a gelatin amount of 50 $mg/m^2$ and dried to prepare Support 1.

<Primer Layer>

| | |
|---|---|
| Lime-treated gelatin | 100 parts |
| Sulfosuccinic acid-2-ethyl hexyl ester salt | 2 parts |
| Chromium alum | 10 parts |

<Preparation of Support 2>

Support 2 was prepared in the same manner as in Support 1 except for using a roller which has been subjected to roughening treatment having different surface roughness in place of a cooling roller subjected to roughening treatment after coating the back resin layer of Support 1. An arithmetical mean roughness after roughening treatment was 1.94 μm.

<Preparation of Support 3>

Support 3 was prepared in the same manner as in Support 1 except for using a roller which has been subjected to fine roughening treatment as in the front resin layer in place of a cooling roller subjected to roughening treatment after coating the back resin layer of Support 1. An arithmetical mean roughness after fine roughening treatment was 0.10 μm.

<Provision of Back Coating Layer>

On the back resin layer of the above Support 1, a coating liquid shown below was coated by a bar coater and dried at 120° C. for 5 minutes to provide a back coating layer.

To measure a surface coating rate, 2 ml of 0.2% food red was added to 100 ml of a coating liquid shown below to prepare a coating liquid. The coating liquid was coated by using a bar coater and dried at 120° C. for 5 minutes to prepare a sheet for recording which is to measure the surface covering rate.

<Coating Liquid 1 for Back Coating Layer>

| | |
|---|---|
| Acrylic ester type emulsion (available from Dicel Co.; density: 1.18 $g/cm^3$) | 100 parts |
| ST-O (trade name, colloidal silica, available from Nissan Chemical Industries, Ltd.) | 5 parts |
| Ethanol | 10 parts |

<Coating Liquid 2 for Back Coating Layer>

| | |
|---|---|
| Acrylic ester type emulsion (available from Dicel Co.; density: 1.18 $g/cm^3$) | 100 parts |
| ST-O (trade name, colloidal silica, available from Nissan Chemical Industries, Ltd.) | 60 parts |
| Ethanol | 10 parts |

<Coating Liquid 3 for Back Coating Layer>

| | |
|---|---|
| Acrylic ester type emulsion (available from Dicel Co.; density: 1.24 $g/cm^3$) | 100 parts |
| ST-O (trade name, colloidal silica, available from Nissan Chemical Industries, Ltd.) | 5 parts |
| Surfactant | 0.5 part |

<Coating Liquid 4 for Back Coating Layer>

| | |
|---|---|
| Polyvinyl alcohol (available from K.K. Kuraray; density: 1.25 g/cm$^3$) | 100 parts |
| ST-O (trade name, colloidal silica, available from Nissan Chemical Industries, Ltd.) | 5 parts |
| Surfactant | 0.5 part |

<Provision of Ink-receptive Layer>

After coating the coating liquid for back coating layer on the back surface resin layer of the support, a coating liquid for an ink-receptive layer mentioned below was coated on the front resin layer surface and dried. In the case of double-layer coating, coating liquids for ink-receptive layers were simultaneously coated by using a slide bead coating device and dried to prepare an ink-jet recording material. Inorganic fine particles were dispersed by a high pressure homogenizer, so that a concentration of a solid content was 16% by weight, and then, coating liquids for ink-receptive layers were prepared. By using these coating liquids, coating and drying were carried out, in the case of a single layer, in a dried solid amount of 26 g/m$^2$, in the case of a double layer, in a dried solid amount at an ink-receptive layer nearer to the support (hereinafter referred to as "a lower layer") of 20 g/m$^2$, and at an ink-receptive layer farther to the support (hereinafter referred to as "an upper layer") of 6 g/m$^2$. The drying conditions were that the coated material was cooled at 5° C. for 30 seconds, dried at 45° C. and 10% RH (relative humidity) until a concentration of the total solid content became 90% by weight, and then, at 35° C. and 10% RH.

<Coating Liquid 1 for Ink-receptive Layer>

| | |
|---|---|
| Fumed silica (average primary particle size: 7 nm) | 100 parts |
| Dimethyldiallyl ammonium chloride homopolymer | 4 parts |
| Boric acid | 4 parts |
| Polyvinyl alcohol (Saponification degree: 88%, average polymerization degree: 3500) | 25 parts |
| Surfactant | 0.3 part |

<Coating Liquid 2 for Ink-receptive Layer>

| | |
|---|---|
| Fumed silica (average primary particle size: 12 nm) | 100 parts |
| Dimethyldiallyl ammonium chloride homopolymer | 4 parts |
| Boric acid | 4 parts |
| Polyvinyl alcohol (Saponification degree: 88%, average polymerization degree: 3500) | 20 parts |
| Surfactant | 0.3 part |

<Coating Liquid 3 for Ink-receptive Layer>

| | |
|---|---|
| Alumina hydrate (pseudo boehmite) (average primary particle size: 15 nm) | 100 parts |
| Boric acid | 2 parts |
| Polyvinyl alcohol (Saponification degree: 88%, average polymerization degree: 3500) | 20 parts |
| Surfactant | 0.3 part |

<Coating Liquid 4 for Ink-receptive Layer>

| | |
|---|---|
| Fumed silica (average primary particle size: 12 nm) | 100 parts |
| Dimethyldiallyl ammonium chloride homopolymer | 4 parts |
| Boric acid | 4 parts |
| Polyvinyl alcohol (Saponification degree: 88%, average polymerization degree: 3500) | 20 parts |
| Surfactant | 0.3 part |
| Polystyrene beads (average particle size: 3 μm) | 0.7 part |
| Polystyrene beads (average particle size: 17 μm) | 0.2 part |

Example 1

On the above Support 1, Coating liquid 1 for back coating layer was coated and dried, and then, Coating liquid 1 for ink-receptive layer was coated and dried to prepare a recording material of Example 1.

Examples 2 to 10 and Comparative Examples 1 to 4

With regard to Examples 2 to 10 and Comparative examples 1 to 4, by using the support and the coating liquid shown in Table 1, recording materials of Examples 2 to 10 and Comparative examples 1 to 4 were prepared in the same manner as in Example 1.

With regard to the recording materials for ink-jet prepared in Examples and Comparative examples, the following evaluations were carried out. The results are shown in Table 2.

<Surface Covering Rate>

By using the recording material containing food red which had been prepared for measuring a back surface covering rate, the surface covering rate was calculated. More specifically, an image was taken by a microscope (manufactured by KEYENCE CO., VH-6300, trade name), and the surface covering rate of the back coating layer was calculated from "(surface area at the portion stained by food red/whole surface area)×100". A value obtained by multiplying the surface covering rate of the back coating layer by a volume ratio of the polymer occupied in the back coating layer was made a surface covering rate by the polymer.

<Glossiness at White Paper Portion>

Glossiness at a white paper portion of a recording material before printing was observed by inclined light and evaluated by the following standards.

◎: High glossiness relative to a color photograph.
○: Good glossiness while slightly inferior to a color photograph.
Δ: Glossiness relative to an art paper or a coat paper.
X: Dull glossiness like a pure paper.

<Chalking>

On one sheet of a recording material was printed a gray solid color with a size of 1 cm square by an ink-jet printer (available from Seiko Epson Corporation, MC-5000, trade name) loaded with pigment inks thereon. Immediately after the printing, another sheet of a recording material was laminated on the printed recording material, so that the back surface of the another sheet of the recording material con tacted to the printed surface of the recording material. Then, 50 g of a weight was placed on the another sheet of the recording material and the laminated recording materials were pulled for 10 cm with a constant rate while placing the weight on the recording sheets. A degree of peeling of ink at the printed portion was observed with naked eyes and totally evaluated by the following standards.

◎: Ink was never peeled off.
○: Slight flaw was observed at the printed portion but the degree thereof involves no problem.
Δ: Ink was peeled off and the degree involves a problem.
X: Ink was almost peeled off and the degree involves a significant problem.

<Paper Feeding and Conveying Property>

Fifty sheets of the recording materials were continuously fed and conveyed by an ink-jet printer (available from Seiko Epson Corporation, PM-780C, trade name), and it was evaluated by the following standards.

◎: No feeding and conveying error occurred.
○: Feeding and conveying error occurred once.
Δ: Feeding and conveying error occurred twice to 5 times.
X: Feeding and conveying error occurred more than 5 times.

<Feeding and Conveying Precision>

A recording material was printed with a gray solid printing by using an ink-jet printer (available from Seiko Epson Corporation, PM-800C, trade name) loaded with dye ink thereon, and a printing quality was observed by the following standards.

◎: Solid is uniform.
○: Banding can be observed at the solid portion but the degree thereof involves no problem.
Δ: Banding can be observed at the solid portion and the degree involves a problem.
X: Significant banding can be observed at the solid portion.

TABLE 1

| | Support | Back coating layer | Ink-jet recording layer Under | Ink-jet recording layer Upper | A | B | C | C/B |
|---|---|---|---|---|---|---|---|---|
| Example | | | | | | | | |
| 1 | 1 | 1 | 1 | 2 | 1.32 | 1.18 | 1.2 | 1.02 |
| 2 | 1 | 1 | 1 | 2 | 1.32 | 1.18 | 6.0 | 5.08 |
| 3 | 1 | 2 | 1 | 2 | 1.32 | 1.18 | 1.0 | 0.85 |
| 4 | 1 | 3 | 1 | 2 | 1.32 | 1.24 | 1.2 | 0.97 |
| 5 | 1 | 4 | 1 | 2 | 1.32 | 1.25 | 1.2 | 0.96 |
| 6 | 1 | 1 | 1 | 3 | 1.32 | 1.18 | 1.2 | 1.02 |
| 7 | 1 | 1 | 1 | 4 | 1.32 | 1.18 | 1.2 | 1.02 |
| 8 | 1 | 1 | 1 | — | 1.32 | 1.18 | 1.2 | 1.02 |
| 9 | 2 | 1 | 1 | 2 | 1.94 | 1.18 | 2.2 | 1.86 |
| 10 | 2 | 1 | 1 | 4 | 1.94 | 1.18 | 2.2 | 1.86 |
| Comparative example | | | | | | | | |
| 1 | 1 | 1 | 1 | — | 1.32 | 1.18 | 0.6 | 0.51 |
| 2 | 1 | 1 | 1 | — | 1.32 | 1.18 | 8.0 | 6.78 |
| 3 | 1 | — | 1 | — | 1.32 | — | | |
| 4 | 3 | 1 | 1 | — | 0.10 | 1.18 | 1.2 | 1.02 |

(Note 1)
Respective numerals of the support, back coating layer and ink-jet recording layer in the table represent a kind thereof.
(Note 2)

TABLE 1-continued

| Support | Back coating layer | Ink-jet recording layer Under | Ink-jet recording layer Upper | A | B | C | C/B |
|---|---|---|---|---|---|---|---|

A: Arithmetical mean roughness (unit; μm) of the back surface of the water resistant support with a cut off value of 0.8 mm regulated by JIS-B-0601-1994.
B: A density (unit; $g/cm^3$) of the organic polymer in the back coating layer.
C: An amount of a coated solid content (unit; $g/m^2$) of the organic polymer in the back coating layer.

TABLE 2

| | Chalking | Feeding and conveying precision | Feeding and conveying property | Glossiness at white paper portion | Surface covering rate (%) |
|---|---|---|---|---|---|
| Example 1 | ◎ | ◎ | ◎ | ◎ | 92 |
| 2 | ◎ | ◎ | ○ | ◎ | 100 |
| 3 | ◎ | ○ | ◎ | ◎ | 63 |
| 4 | ◎ | ◎ | ◎ | ◎ | 93 |
| 5 | ◎ | ◎ | ◎ | ◎ | 97 |
| 6 | ◎ | ◎ | ◎ | ◎ | 92 |
| 7 | ◎ | ◎ | ◎ | ◎ | 92 |
| 8 | ○ | ◎ | ◎ | ◎ | 92 |
| 9 | ◎ | ◎ | ◎ | ◎ | 95 |
| 10 | ◎ | ◎ | ◎ | ◎ | 95 |
| Comparative example 1 | ○ | Δ | ◎ | ◎ | 51 |
| 2 | ○ | ◎ | Δ | ◎ | 100 |
| 3 | ◎ | Δ | X | ◎ | — |
| 4 | ◎ | ○ | Δ | ◎ | 100 |

As can be seen from Table 2, it can be understood that the ink-jet recording material of Examples 1 to 10 according to the present invention are superior to that of the recording materials of Comparative examples 1 to 4 since chalking, feeding and conveying precision, feeding and conveying property and glossiness at the white paper portion are all simultaneously superior to those of the Comparative recording materials. Incidentally, ink absorption properties of all the Examples 1 to 10 and Comparative examples 1 to 4 were good. In particular, glossiness at the white paper portion of the ink-jet recording material of Example 6, and flaw resistance of the ink-receptive layer of recording materials for ink-jet of Examples 7 and 10 were extremely good.

As can be seen from the above-mentioned results, an ink-jet material according to the present invention has particularly high glossiness, and excellent in feeding and conveying property, a feeding and conveying precision, and simultaneously an ink-jet recording material which difficultly causes chalking of pigment ink immediately after printing can be obtained.

What is claimed is:

1. An ink-jet recording material which comprises a water resistant support, an ink-receptive layer containing inorganic fine particles having an average particle size of a primary particle of 3 to 30 nm on one surface of the support, and a back coating layer mainly comprising an organic polymer provided on an opposite surface of the support to the surface on which the ink-receptive layer is provided, wherein when an arithmetical mean roughness Ra measured with a cut off value of 0.8 mm regulated by JIS-B-0601-1994 of the surface on which the back coating layer has been provided of the water resistant support is made A μm, a density of the organic polymer in the back coating layer is made B $g/cm^3$, and an amount of a solid component of the organic polymer provided as the back coating layer is made C g/cm$^2$, then A is 1 to 5 $\mu$m and A, B and C satisfy the following formula (I):

$$0.6 \times A < C/B < 6 \quad (I).$$

2. The ink-jet recording material according to claim 1, wherein the inorganic fine particles are at least one of fumed silica and alumina hydrate.

3. The ink-jet recording material according to claim 1, wherein a surface covering rate by the organic polymer of the surface on which the back coating layer has been provided on the water resistant surface is 70% or more.

4. The ink-jet recording material according to claim 1, wherein the ink-receptive layer comprises two or more layers, and an average primary particle size of the inorganic fine particles contained in the ink-receptive layer nearest to the water resistant support is smaller than an average primary particle size of the inorganic fine particles contained in the ink-receptive layer farthest to the water resistant support.

5. The ink-jet recording material according to claim 1, wherein the ink-receptive layer comprises two or more layers, and the ink-receptive layer farthest to the water resistant support contains an alumina hydrate.

6. The ink-jet recording material according to claim 1, wherein the ink-receptive layer contains fine particles having an average particle size of 1 $\mu$m or more to less than 5 $\mu$m and fine particles having an average particle size of 5 $\mu$m to 20 $\mu$m in an amount of 0.1 to 1.5 g/m$^2$ in total.

* * * * *

UNITED STATES PATENT AND TRADEMARK OFFICE

CERTIFICATE OF CORRECTION

PATENT NO. : 6,610,389 B2
APPLICATION NO. : 10/153676
DATED : August 26, 2003
INVENTOR(S) : Tomoko Ishimaru, Yukio Tokunaga and Masahiko Maruyama It is certified that error appears in the above-identified patent and that said Letters Patent is hereby corrected as shown below:

On the title page, item (73) should read

(73) Assignee: after "Mitsubishi Paper Mills Limited, Tokyo (JP)" insert
-- Seiko Epson Corporation, Tokyo (JP) --

Signed and Sealed this

Eighteenth Day of August, 2009

David J. Kappos
*Director of the United States Patent and Trademark Office*